(12) United States Patent
Schluessler et al.

(10) Patent No.: US 8,701,187 B2
(45) Date of Patent: Apr. 15, 2014

(54) RUNTIME INTEGRITY CHAIN VERIFICATION

(75) Inventors: Travis T. Schluessler, Hillsboro, OR (US); David Durham, Beaverton, OR (US); Hormuzd Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1779 days.

(21) Appl. No.: 11/729,730

(22) Filed: Mar. 29, 2007

(65) Prior Publication Data

US 2008/0244114 A1    Oct. 2, 2008

(51) Int. Cl.
*G06F 21/00* (2013.01)
(52) U.S. Cl.
USPC .................. 726/23; 726/22; 726/24; 713/164
(58) Field of Classification Search
USPC ............................... 713/164, 188; 726/23, 24
See application file for complete search history.

(56) References Cited

U.S. PATENT DOCUMENTS

| 6,651,186 | B1* | 11/2003 | Schwabe ..................... 714/38 |
| 2006/0005230 | A1* | 1/2006 | England et al. ................ 726/1 |
| 2006/0047955 | A1* | 3/2006 | Prevost et al. ............... 713/165 |
| 2006/0161761 | A1* | 7/2006 | Schwartz et al. ............ 711/216 |
| 2007/0005992 | A1 | 1/2007 | Schluessler |
| 2007/0261120 | A1* | 11/2007 | Arbaugh et al. ............... 726/26 |
| 2008/0034350 | A1* | 2/2008 | Conti ........................... 717/124 |

OTHER PUBLICATIONS

"OS Independent Run-time System Integrity Services", Intel Corporation, 2005.

* cited by examiner

*Primary Examiner* — Vu Le
*Assistant Examiner* — Tracy Mangialaschi
(74) *Attorney, Agent, or Firm* — Trop, Pruner & Hu, P.C.

(57) ABSTRACT

A runtime integrity check may be implemented for a chain or execution path. When the chain or execution path calls other functions, the correctness of an entity called from the execution path is verified. As a result, attacks by malicious software that attempt to circumvent interrupt handlers can be combated.

12 Claims, 3 Drawing Sheets

RUNTIME INTEGRITY CHAIN VERIFICATION

BACKGROUND

This relates to combating malicious attacks against computer systems.

Over the last few years, rootkits and stealth memory attacks on computing platforms have increased exponentially. These attacks modify the lowest layers in the host operating system (OS)/hardware registers, such as the Interrupt Dispatch Tables (IDTs), exception handlers, and System Call Tables, to circumvent or disable anti-virus or other security software agents on the system.

A common vector used by hackers for circumvention of software programs is the interception of function pointers relating to the program. The mechanics of how this accomplished vary slightly based on the specific target of the attack (two examples are provided below). One of the main reasons for attackers to use this method is to avoid detection by executable code integrity checkers such as System Integrity Services (See OS Independent Run-Time System Integrity Services, 2005, available from Intel Corporation, Santa Clara, Calif.).

Such an attack may be accomplished by the circumvention of an interrupt handler. As used herein, an "interrupt handler" includes exception handlers. A processor looks up the address of the Interrupt Dispatch Table (IDT) in a processor register. Other mechanisms can also be used to access interrupt handlers. Using the IRQ number provided by the interrupt controller, the processor selects a specific entry in the IDT. This value is the address of the interrupt service routine. The interrupt service routine then executes, and through the course of its execution it may schedule a deferred procedure call (DPC) to handle additional processing associated with the interrupt before returning execution control to the operating system kernel and retiring the interrupt.

An attacker can circumvent this process by modifying any one of the function pointers that make up the executable code chain. By changing such a pointer to point to an attacker's code, the attacker is able to run malicious code while remaining undetected by integrity checkers that only monitor static executable code. For example, if an integrity checker simply measured and protected the interrupt service routine and DPC executable code, this attack will go undetected.

Another manner this attack can be waged is via modification of a program's Import Address Table (IAT) or other mechanisms for transferring control to other software programs. This is a per process table of function pointers that is initialized when a program loads into memory with the addresses of executable code that the loaded program references such as dynamic link libraries and system services.

In both of these examples, the attacker modified a dynamic function pointer at runtime within a program that is otherwise protected by existing security methods.

DETAILED DESCRIPTION

Monitoring using a run-time integrity chain may detect the class of attacks where the attacker modifies a dynamic function pointer at runtime. This detection involves verifying the correctness of the first, most fundamental (hardware-provable if possible) entity that has an execution path leading through one or more components that need to be protected. Then, after determining where the entity calls the next software component in the chain, the actual in-memory value of the function pointer or instruction that leads to the next component is read. Based on this pointer, the next software component that will be executed is examined and it is determined if it is the expected component and if it is correct (unmodified). These steps are repeated until the end of the desired execution path that requires control flow protection is reached. If a software component is determined to be incorrect or the end of the desired execution path is never reached, a fault is generated, and remedial action can be taken.

The entire process is repeated periodically to ensure nothing has changed or an alternate mechanism is used to prevent an attacker from modifying the now verified execution path links.

The entity performing the verification may be an isolated execution environment. A service processor is an example of an isolated execution environment. A service processor is a processor/control logic for performing tasks outside the context of a host processor. A service processor may be termed an "adjunct processor," and may be a partition of a host processor, an embedded device, a chipset component, etc. A service processor may also be implemented by a host processor when it executes management code on a secured/trusted partition or in a system management mode. An isolated execution environment is inaccessible from host-processor resident software in order to provide the required security attributes. Active management technology (AMT) (See Intel® Active Management Technology Deployment and Reference Guide, Version 1.0, October 2006, available from Intel Corporation, Santa Clara, Calif.) exhibits the required characteristics, as does a virtual machine monitor (VMM). Any device that can perform reliable direct memory access (DMA) reads into host physical memory and/or access the components comprising the execution path in a manner that cannot be circumvented by an attacker can serve this function. The integrity measurement module (IMM) is the service that performs the verification of individual elements in the integrity chain at run-time. It runs within the isolated execution environment.

Figure 1:
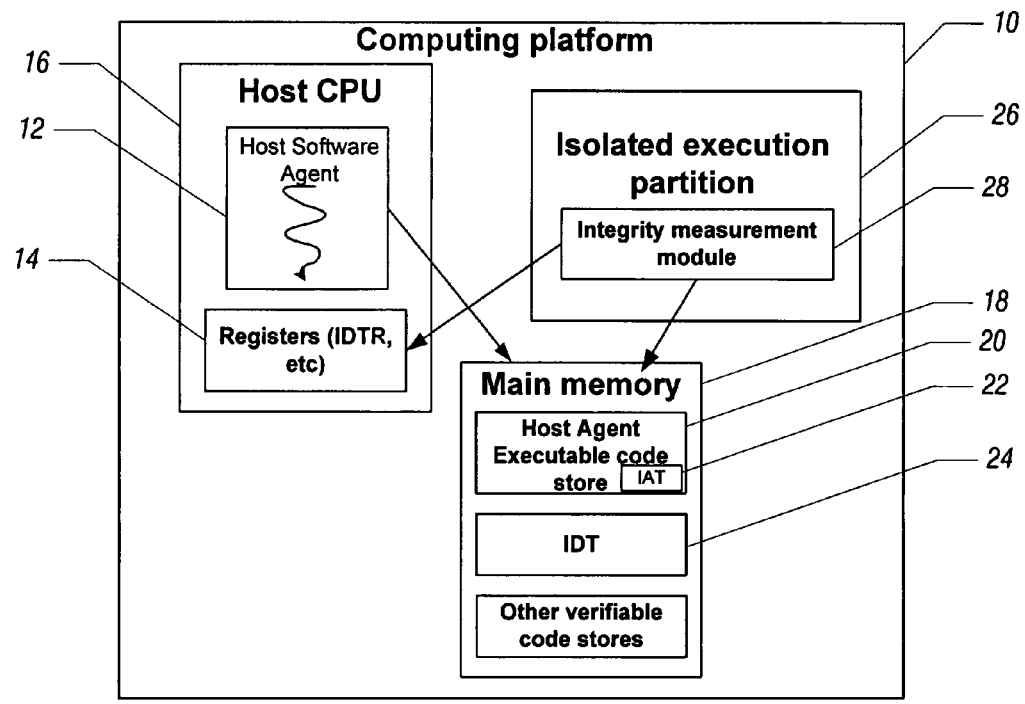
FIG. 1 is a system depiction for one embodiment.

The system architecture is shown in FIG. 1 for one embodiment. The platform 10 includes a host software agent 12 coupled to registers 14, including the Interrupt Dispatch Table (IDT) Register (IDTR) with the host processor 16. The main memory 18 can include a host agent executable code store 20 that stores the Import Address Table (IAT) 22. The main memory may also store the Interrupt Dispatch Table (IDT) 24. An isolated execution environment 26 stores the integrity measurement module 28.

The Integrity Measurement Module (IMM) 28 may be provisioned with information that describes the expected execution path to be verified. This can either be pre-provisioned by a system administrator as defined by policy, or delivered to the IMM by a registration request from the host software agent 12, with the contents signed by the software's vendor and verified by the IMM using that vendor's public key such as can be obtained through a certificate authority. The specific information required may be similar to that described in an integrity manifest and its references to other integrity manifests. Additional information includes the manifests corresponding to subsequent components to be verified in the chain, and the locations of where the current component transitions to the next component, and the relative location within the next component it transitions to.

A signed manifest can specify the identities of other code components that are expected to be in the execution path by signature, name and version of those components or other means of identifying their manifest or code that should be referenced by the source program's external symbols. Furthermore, trusted vendor software agents can specify the execution path on behalf of other programs or services, for example, an intrusion prevention system that identifies the correct interrupt service routine, drivers, and libraries that are expected in a properly configured system.

Figure 2:
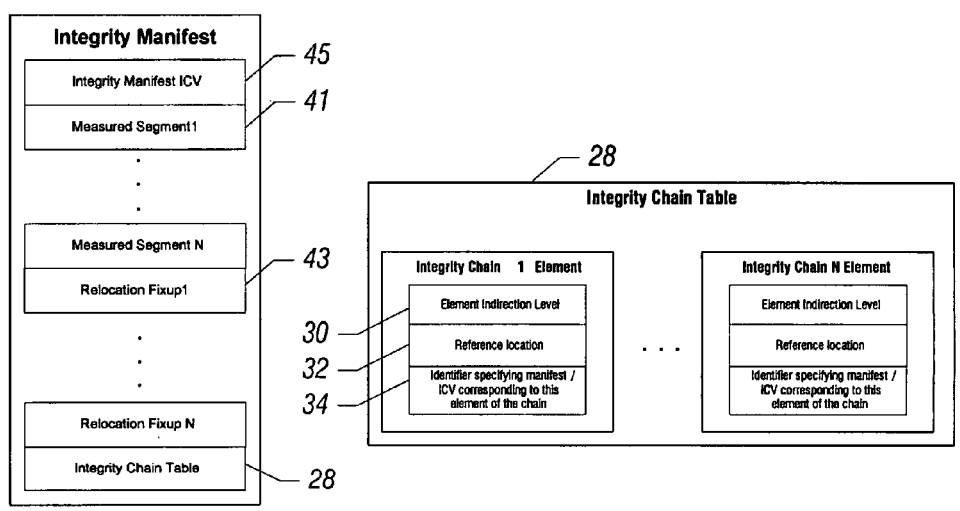
FIG. 2 is a schematic depiction of an integrity manifest for one embodiment.

FIG. 2 is a block diagram of an embodiment of an integrity manifest. Integrity manifest structure 39 represents one embodiment of an integrity manifest associated with the agents of FIG. 1. Integrity manifest structure 39 may include an integrity manifest integrity check value (ICV) 45. Integrity manifest ICV 45 represents an agent signature, or some other signing of integrity manifest structure 39 to attest its validity. For example, once the information that makes up integrity manifest structure 39 is obtained, a cryptographic hash may be performed and the result stored as a signature covering the various fields of integrity manifest structure 39. The resulting hash value can be placed in integrity manifest structure 39 as a check/compare value for a reading entity to determine the validity of the manifest. In one embodiment, the cryptographic hash is based on both the fields of integrity manifest structure 39, as well as a private key of an asymmetric key pair of a developer of the software with which integrity manifest structure 39 will be associated. An entity reading/verifying integrity manifest structure 39 could check integrity manifest ICV 28 to determine the validity of integrity manifest structure 39 with the public key of the asymmetric key pair. In one embodiment, the reading entity assumes the other values in integrity manifest structure 39 are correct if integrity manifest ICV 28 verifies properly.

Integrity manifest structure 39 also includes information to indicate the validity of the agent to which the manifest belongs or is associated. For example, integrity manifest can include measured segments 41. A measured segment may include start data and end data to indicate the section of the agent source code to which it pertains. An ICV can be performed on the section of agent code indicated by the start and end data and placed in the measured segment. The ICV is generated through the use of a check algorithm that produces a value. Thus, the algorithm can be performed on a section (indicated by the start and end data) of the source code for an agent, and the ICV obtained. Performing the algorithm on the agent code in the host memory should produce a determinable result (i.e., either the same result, or a result that varies in an expected way, as described in more detail below). Multiple sections of the source code could be checked with the same or differing algorithms to generate ICVs. Additionally, one or more selected sections of the source code could be checked, up to checking the entirety of the code source. In one embodiment, the start and end data are the start and end of the measured agent.

In addition to the measured segments, integrity manifest structure 39 includes relocation fix-ups 43. The relation fix-ups indicate a reference in the source code of the measured agent to another routine or function. The routine or function can refer to another part of the code (e.g., segment relocation), or a function call external to the measured agent (e.g., symbol relocation). The routine or function may be to routines within the same software program (i.e., internal reference), or to libraries, functions/routines common to multiple programs, system routines, etc. (i.e., external reference). These types of relocation fix-ups are intended to be illustrative and not restrictive, as other types of relocation could also be supported depending on the specific object file format in use. Just as the agent itself may be dynamically loaded into memory, the external function may be dynamically loaded, and will not necessarily have a constant address. The source code may refer to a memory address for the function that does not correspond to the actual location of the function in physical memory. The loader indicates to the agent the correct memory location of the function when the agent is loaded. The relocation fix-ups may, thus, also include the actual values of the correct physical memory locations of the corresponding functions. In one embodiment, different subroutines that make up an agent are stored in separate, dynamically assigned memory locations. The relocation fix-ups could thus apply to internal function calls in a similar fashion as described for external function calls.

Because the locations of the certain functions may change, integrity manifest structure 39, as determined for an agent in storage, may differ once loaded to memory. When loaded to memory, the relocation values can be added to the information in integrity manifest structure 39. Integrity manifest ICV, or the integrity manifest signature, can be checked for the loaded program, and the data within integrity manifest structure 39 used to verify the identity of an associated agent. Thus, if the actual offsets in memory are known for the indicated relocation fix-ups, they can be stored in memory, and the differences can be determined for an integrity manifest structure 39 as applied to an agent in memory. The process of verifying the manifests and their associated agents is described in more detail below.

The integrity chain table 28 can specify multiple chains. This means there could be multiple execution paths that require verification. For each execution path requiring verification there is one integrity chain. An integrity chain is comprised of the linked elements contained within the manifest for each program in the chain.

Integrity Chain Element fields include an Element Indirection Level 30 that specifies the level of indirection needed to reach this element of the chain. Level of indirection means the number of function pointers that must be traversed. A value of 2 is this field could be used for instance to traverse a program's IAT into an unrelated program. A value of 1 could represent a direct call into a function in the program's address space.

Reference Location field 32 specifies the location of the reference (function call) to the function represented by this chain element within the original program.

An Identifier 34 specifying manifest/ICV corresponding to this element of the chain allows the IMM to determine the manifest associated with the program code that should be next in the execution path. The IMM uses this identifier to look up the next manifest, ascertain whether the code that would be executed next is correct by verifying the ICV of the code in memory matches the ICV in the manifest, and then checks to see if there are subsequent integrity chain elements contained in that manifest that require verification.

Figure 3:
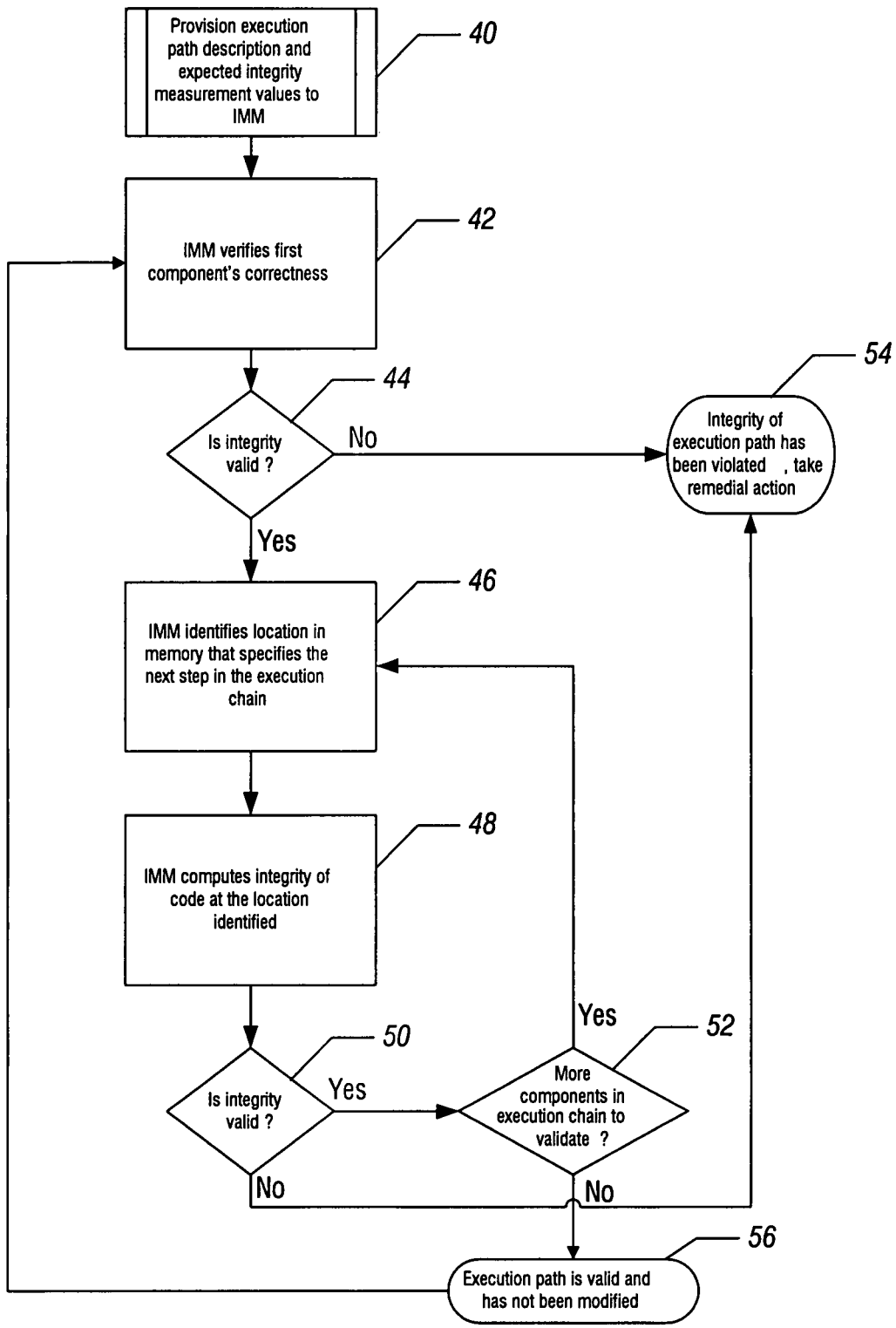
FIG. 3 is a flow chart for one embodiment.

After starting up (block 40), the correctness of the first entity in the execution path is verified at block 42 in FIG. 3. The first entities in the examples given above are the processor's register pointing to the IDT, such as IDT register (IDTR) in Intel IA32 architectures and the IAT 22. For interrupt path verification, the IMM reads the IDTR to get the location of the IDT. It could perform an integrity check on the IDT itself, though this is not required and is unlikely due to the variable nature of the contents of the IDT.

In order to read the IDTR in a tamper-proof manner, the isolated execution environment may have some additional properties. If the isolated execution environment is a VMM, then this value can be read from the processor directly after a virtual machine exit. In the case of a system with executable code integrity checkers, such as System Integrity Services, where IMM is running in AMT, system management mode may be used to securely report the IDTR value.

In step 42, the IMM performs an initial integrity check on the host software agent 12.

Additionally, the virtual to physical memory mappings may be verified to assure that these have not been modified by malware to confuse the IMM into seeing a different layout of physical memory verses that seen by the validated programs when they are executing.

Next, if the integrity is valid (diamond 44), the flow (blocks 46 and 48) determine where the entity calls the next software component in the chain and reads the actual in-memory value of the function pointer or instruction that leads to the next component. For the interrupt path verification example, in this step the IMM retrieves the entry from the IDT corresponding to the execution path to be verified. This entry will either have been identified in the integrity manifest, or it can be determined dynamically through a more complex process of iterating through the IDT and comparing it with values in the kernel's symbol table until a value is found that correlates to the ISR that is next in the execution path. The value at the resulting IDT entry can be transformed into a memory location in the next code region to be verified (the interrupt service routine in this example).

For the IAT example, the IMM uses a reference point identified in the integrity manifest to locate the call out location. At that location in memory, the loader will have replaced the instruction with a pointer that points to a specific entry in the IAT as a pointer to the next component in the executable code path.

Based on this pointer, if integrity is still valid (diamond 50), the next software component that will be executed is examined (diamond 52) and it is determined if it is the expected component and if it is correct (unmodified). Using the memory location thus acquired, the IMM then does an integrity check on the code residing at that memory location. In the interrupt path example, this would be the interrupt service routine. The IMM compares the resulting measurement of the code in memory to the integrity check values specified in the integrity manifest. If the values match, then the chain check can proceed to the next component in the chain.

Blocks 42 through 52 are repeated (if the execution path is valid at 56) until the end of the desired execution path is reached. Additional components can then be verified in the chain, such as a deferred procedure call in the interrupt example, or additional kernel services or the system call table in the IAT example.

If an execution path violation is detected (block 54), the IMM can take remedial action, such as forcing the platform onto a remediation network, halting communications, halting execution of the affected components, or by repairing the modified code to its original state.

Multiprocessor systems can be protected using this method by the IMM checking control flow specific to each processor or core.

The actual software chain that implements interrupt dispatching may vary from that depicted in the example. Windows XP®, for example, requires execution to flow through an Interrupt Object followed by a kernel function. In situations where such code is executed it must be included in the verification chain.

In addition, it is possible to protect against registered based exception handler attacks, such as attacks directed to the debug registers. Attacks directed to debug registers may trigger an exception when a certain memory location is accessed. This is a special case of exception handler attacks since it can be waged through use of a debug register modification, while requiring no modification to the program's code and memory. In addition to monitoring an integrity chain from IDTR through debug exception handler code, the system may also monitor vulnerable registers.

Figure 4:
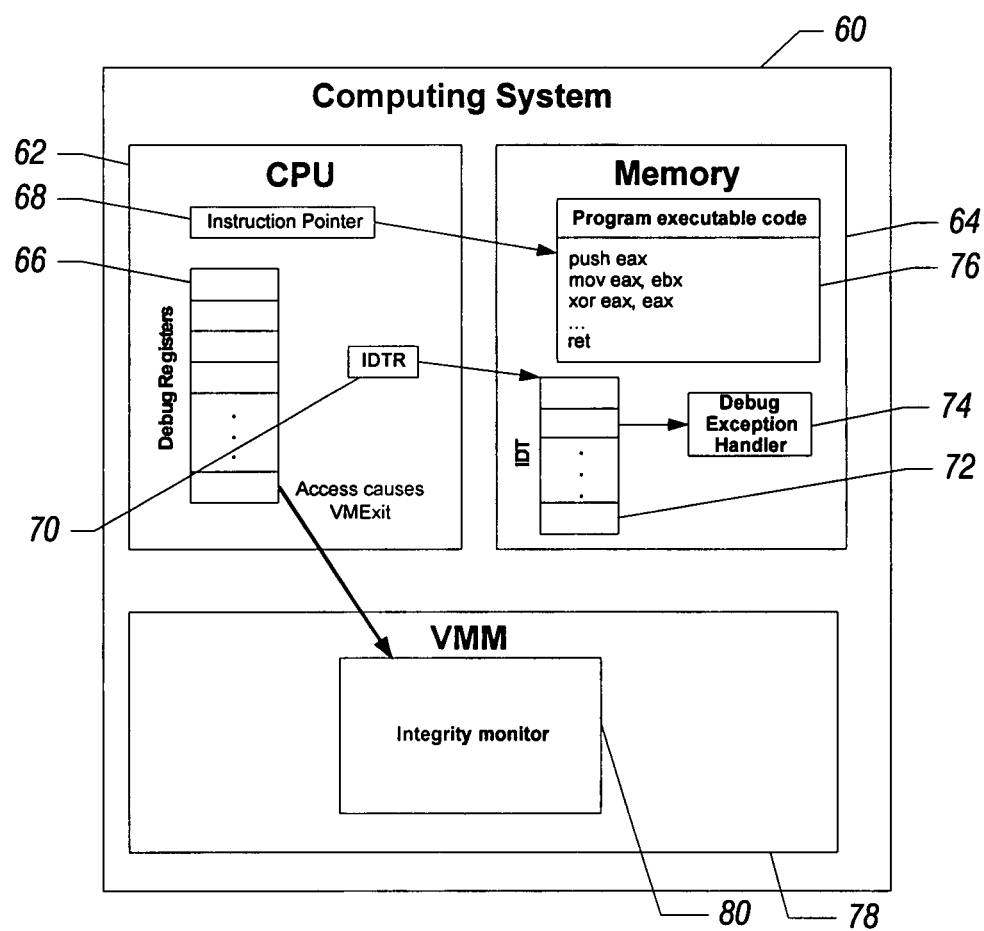
FIG. 4 is a depiction of a system to defeat attacks using debug registers.

Referring to FIG. 4, a computing system 60 may include a CPU or processor 62 and a memory 64. A virtual machine monitor 78 may include an integrity monitor 80.

The processor 62 may include an instruction pointer 68 pointing to a program executable code 76 and memory 64. Debug registers 66 may point to the virtual machine monitor 78 so that access causes a virtual machine (VM) exit as indicated. An IDTR 70 may be part of an IDT 72 and may include a debug exception handler 76.

The integrity monitor 80 runs within the virtual machine monitor 78. Accesses to critical registers that enable break points cause a virtual machine exit event to occur. This then transfers control to the integrity monitor running within the virtual machine monitor 78. The integrity monitor 80 then checks the values being placed on the debug registers to determine whether a trap has been placed within a protected program. If so, the integrity monitor can trigger policy driven remediation. In addition, the virtual machine monitor 78 may enforce write protection on exception handler code to ensure they remain unmodified. This also may assure no other exception handler attacks may be waged.

The virtual machine monitor 78 may provide registration service that the operating system loader calls when a protected program is loaded. During this time, the loader passes to the integrity monitor the program's integrity manifest, as well as the information indicating that the program may be protected from exception handler attacks during debug register monitoring.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A non-transitory computer readable medium storing instructions that, when executed, enable a computer to:
   at run-time verify the correctness of an entity that has an execution path leading through one or more software components that need to be protected;
   using a monitor that runs within a virtual machine monitor, said monitor provisioned with a description of said execution path;
   in response to accessing a register, cause a virtual machine exit and transfer control to the monitor;
   determine where the entity calls the next software component in the path using a signed manifest specifying the sequence of execution;

read a memory address leading to the next software component;

examine the next software component in the execution path and make code measurements on said component; and compare the code measurements with stored values in said signed manifest to determine if the next software component in the execution path is the expected and correct software component.

2. The medium of claim 1 further storing instructions to repeat the steps until the desired execution path is verified.

3. The medium of claim 2 further storing instructions to generate a fault if the next software component is incorrect or the end of the desired execution path is not reached.

4. The medium of claim 3 further storing instructions to periodically repeat the verification to ensure that nothing has changed.

5. The medium of claim 3 further storing instructions to periodically use a mechanism to detect an attacker subsequently modifying the verified execution path.

6. A system comprising:

a processor;

an isolated execution environment including a virtual machine monitor and a monitor that runs within said virtual machine monitor, said monitor provisioned with a description of an execution path, in response to accessing a register, said virtual machine monitor to cause a virtual machine exit and transfer of control to the monitor;

a signed integrity manifest to describe the expected execution path to be verified;

a memory storing executable code for an interrupt handler; and said monitor within said isolated execution environment to determine the next software component to be called in the expected execution path, to read a value of a function pointer that leads to the next software component in the expected execution path, make code measurements on said component and compare said measurements to stored values in said manifest to determine if said next software component in the execution path is the expected and correct component.

7. The system of claim 6 wherein said integrity manifest includes an integrity chain table that keeps track of the expected execution path to be verified.

8. The system of claim 6, said isolated execution environment to repeat the verification component-by-component until the entire expected execution path is verified.

9. The system of claim 8, said isolated execution environment to generate a fault if the next software component is incorrect or the end of the expected execution path is not reached.

10. The system of claim 9, said processor to periodically repeat the verification to ensure that nothing has changed.

11. The system of claim 10, said processor to periodically use a mechanism to detect an attacker subsequently modifying a verified execution path.

12. The system of claim 6 to generate an integrity chain describing an execution path of a program and to store an integrity chain to verify an execution path of the program as loaded.

\* \* \* \* \*